US012086918B2

(12) United States Patent
Yang et al.

(10) Patent No.: US 12,086,918 B2
(45) Date of Patent: Sep. 10, 2024

(54) IMAGE PROCESSING METHOD AND APPARATUS AND COMPUTER-READABLE STORAGE MEDIUM

(71) Applicant: Tencent Technology (Shenzhen) Company Limited, Shenzhen (CN)

(72) Inventors: Jianping Yang, Shenzhen (CN); Hongrui Li, Shenzhen (CN); Jie Da, Shenzhen (CN); Weizhou Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 69 days.

(21) Appl. No.: 17/988,715

(22) Filed: Nov. 16, 2022

(65) Prior Publication Data
US 2023/0083897 A1    Mar. 16, 2023

Related U.S. Application Data

(63) Continuation of application No. PCT/CN2022/089701, filed on Apr. 28, 2022.

(30) Foreign Application Priority Data

May 21, 2021   (CN) .......................... 202110558940.2

(51) Int. Cl.
*G06T 13/80*      (2011.01)
*G06F 3/0488*    (2022.01)
(Continued)

(52) U.S. Cl.
CPC ............ *G06T 13/80* (2013.01); *G06F 3/0488* (2013.01); *G06F 9/451* (2018.02); *H04L 51/04* (2013.01); *H04L 51/10* (2013.01); *G06F 3/1407* (2013.01)

(58) Field of Classification Search
None
See application file for complete search history.

(56) References Cited

U.S. PATENT DOCUMENTS

2014/0344726 A1    11/2014   He et al.
2015/0334075 A1*   11/2015   Wang ..................... H04L 51/04
                                                                715/752
(Continued)

FOREIGN PATENT DOCUMENTS

CN           104158719 A       11/2014
CN           106059907 A       10/2016
(Continued)

OTHER PUBLICATIONS

Tencent Technology, ISR, PCT/CN2022/089701, Jul. 7, 2022, 2 pgs.

(Continued)

*Primary Examiner* — Jwalant Amin
(74) *Attorney, Agent, or Firm* — Morgan, Lewis & Bockius LLP

(57) ABSTRACT

A computer device displays a conversation page of a target conversation corresponding to an instant messaging application, The target conversation comprises at least two conversation participants. In accordance with a determination that emojis transmitted by the at least two conversation participants in the target conversation satisfy a trigger condition for a first emoji interaction animation, the computer device displays the first emoji interaction animation on the conversation page. The first emoji interaction animation comprises an interaction animation between the emojis transmitted by the at least two conversation participants.

20 Claims, 7 Drawing Sheets

(51) Int. Cl.
*G06F 9/451* (2018.01)
*H04L 51/04* (2022.01)
*H04L 51/10* (2022.01)
*G06F 3/14* (2006.01)

(56) References Cited

U.S. PATENT DOCUMENTS

| | | | |
|---|---|---|---|
| 2015/0365496 A1 | 12/2015 | Matsumoto | |
| 2016/0352667 A1* | 12/2016 | Pickett | H04L 67/535 |
| 2017/0336960 A1* | 11/2017 | Chaudhri | H04L 51/18 |
| 2019/0122403 A1 | 4/2019 | Woo et al. | |
| 2022/0394001 A1* | 12/2022 | Cundall | G06F 3/04817 |

FOREIGN PATENT DOCUMENTS

| | | |
|---|---|---|
| CN | 107624239 A | 1/2018 |
| CN | 108322383 A | 7/2018 |
| CN | 111193654 A | 5/2020 |
| CN | 113438150 A | 9/2021 |
| CN | 114531406 A | 5/2022 |
| EP | 2963555 A1 | 1/2016 |
| EP | 3101845 A1 | 12/2016 |
| JP | 2014124239 A * | 7/2014 |
| JP | 2017027443 A | 2/2017 |
| JP | 2018524679 A | 8/2018 |
| KR | 20180015621 A | 2/2018 |
| WO | WO-2013048224 A2 * | 4/2013 ......... H04L 12/1822 |
| WO | WO 2014133191 A1 | 9/2014 |
| WO | WO 2014183443 A1 | 11/2014 |
| WO | WO 2016195666 A1 | 12/2016 |
| WO | WO-2021000696 A1 * | 1/2021 ......... G06Q 30/0207 |

OTHER PUBLICATIONS

Tencent Technology, WO, PCT/CN2022/089701, Sep. 7, 2022, 5 pgs.
Tencent Technology, IPRP, PCT/CN2022/089701, Nov. 21, 20232, 6 pgs.

* cited by examiner

IMAGE PROCESSING METHOD AND APPARATUS AND COMPUTER-READABLE STORAGE MEDIUM

CROSS-REFERENCE TO RELATED APPLICATIONS

This application is a continuation application of PCT Patent Application No. PCT/CN2022/089701, entitled "AN IMAGE PROCESSING METHOD, APPARATUS AND COMPUTER-READABLE STORAGE MEDIUM" filed on Apr. 28, 2022, which claims priority to Chinese Patent Application No. 202110558940.2, filed with the State Intellectual Property Office of the Peoples Republic of China on May 21, 2021, and entitled "IMAGE PROCESSING METHOD AND APPARATUS, AND COMPUTER-READABLE STORAGE MEDIUM", all of which are incorporated herein by reference in their entirety.

FIELD OF THE TECHNOLOGY

This application relates to the field of communications technologies, and in particular, to an image processing method and apparatus and a non-transitory computer-readable storage medium.

BACKGROUND OF THE DISCLOSURE

With the development of the Internet, the communications technology, especially instant messaging, has become an indispensable way of network communication in peoples life. In recent years, a mobile instant messaging technology has also emerged, enabling instant messaging to be performed based on various mobile communication devices (such as mobile phones).

In the related art, users can transmit emojis during chatting, which increases fun of chatting and enriches user experience. In addition, in order to enrich the expression dimension of emojis, simple effects may be further triggered for manifestation according to styles of the emojis after the emojis are transmitted.

In the process of research and practice of the related art, the inventor of this application found that the manifestation mode of the emojis in the related art is relatively rigid, the user has a relatively weak ability to express emotions, and the diversity of images is relatively poor.

SUMMARY

Embodiments of this application provide an image processing method and apparatus and a non-transitory computer-readable storage medium, so as to improve the diversity of images.

To resolve the foregoing technical problem, the embodiments of this application provide the following technical solutions.

An image processing method is provided, performed by a computer device and including:
  displaying a conversation page of a target conversation corresponding to an instant messaging application, the target conversation including at least two conversation participants; and
  in accordance with a determination that emojis transmitted by the at least two conversation participants in the target conversation satisfy a trigger condition for the first emoji interaction animation, displaying a first emoji interaction animation on the conversation page. The first emoji interaction animation including an interaction animation between the emojis transmitted by the at least two conversation participants.

An image processing apparatus is provided, including:
  a display unit, configured to display a conversation page of a target conversation in a client, the target conversation including at least two conversation participants; and
  a first display unit, configured to display a first emoji interaction animation on the conversation page when emojis transmitted by the at least two conversation participants satisfy a trigger condition for the first emoji interaction animation, the first emoji interaction animation including an interaction animation between the emojis transmitted by the at least two conversation participants.

A non-transitory computer-readable storage medium, storing a plurality of instructions, the instructions being configured to be loaded by a processor, to perform the steps in the foregoing image processing method.

A computer device, including a memory, a processor, and a computer program stored on the memory and runnable on the processor, the processor, when executing the computer program, implementing the steps in the foregoing image processing method.

A computer program product or a computer program, including computer instructions, the computer instructions being stored in a storage medium. A processor of the computer device reads the computer instructions from the storage medium, and executes the computer instructions, to cause the computer device to perform the steps in the foregoing image processing method.

In the embodiments of this application, a conversation page of a target conversation in a client is displayed. The target conversation includes at least two conversation participants. A first emoji interaction animation is displayed on the conversation page when emojis transmitted by the at least two conversation participants satisfy a trigger condition for the first emoji interaction animation. The first emoji interaction animation includes an interaction animation between the emojis transmitted by the at least two conversation participants. In this way, when the emojis transmitted by the at least two conversation participants satisfy the trigger condition for the first emoji interaction animation, the first emoji interaction animation for interaction between the emojis transmitted by the at least two conversation participants can be played in real time, which can increase fun and diversity of communication interaction and further greatly improve the diversity of images and animations that are displayed in chat messages. In addition, the interaction animation between the emojis is presented according to system settings, and the client is not required to store the corresponding animation, so that the step of selecting the corresponding animation by a user is omitted. In this way, the storage space of the client (for example, a terminal) is saved, and the efficiency of interaction is improved.

BRIEF DESCRIPTION OF THE DRAWINGS

To describe the technical solutions in the embodiments of this application more clearly, the following briefly describes accompanying drawings required for describing the embodiments. Apparently, the accompanying drawings in the following description show merely some embodiments of this application, and a person skilled in the art may still derive other drawings from these accompanying drawings without creative efforts.

DESCRIPTION OF EMBODIMENTS

The technical solutions in the embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

Embodiments of this application provide an image processing method and apparatus, and a computer-readable storage medium.

Figure 1:
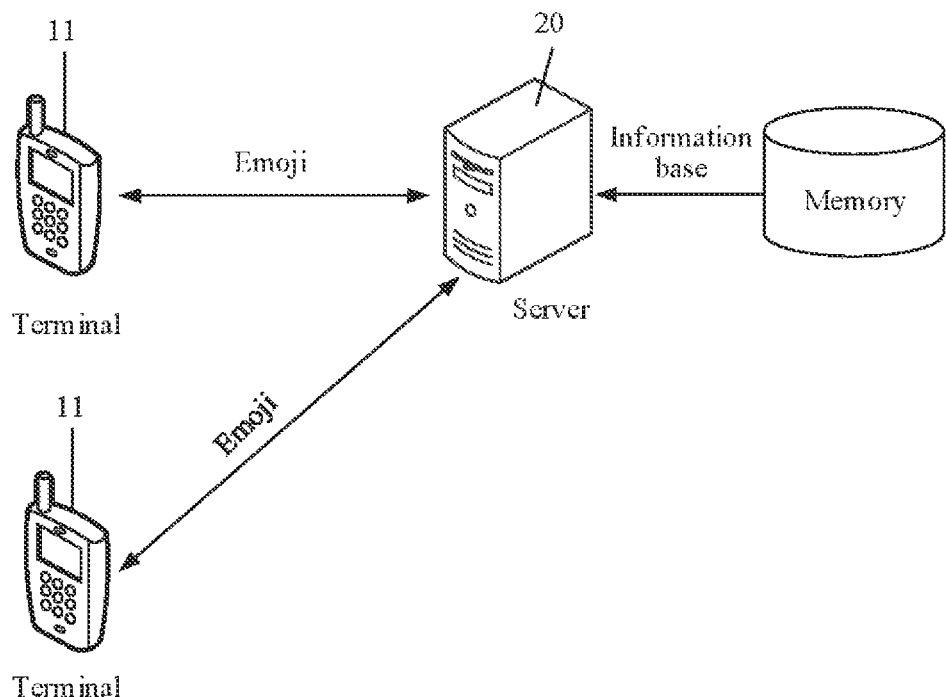
FIG. 1 is a schematic diagram of a scenario of an image processing system according to an embodiment of this application.

FIG. 1 is a schematic diagram of a scenario of an image processing system according to an embodiment of this application, which includes a terminal 11 and a server 20. The terminal 11 and the server 20 may be connected through a communication network. The communication network includes a wireless network and a wired network. The wireless network includes one or a combination of a wireless wide area network, a wireless local area network, a wireless metropolitan area network, or a wireless personal area network. The network includes network entities such as a router and a gateway, which are not shown in the figure. The terminal 11 may exchange information with the server 20 through the communication network. For example, the terminal 11 synchronizes emojis transmitted by a user to the server 20, and the server 20 distributes the emojis to the terminals 11 in a same chat environment, so as to realize communication between different terminals 11. In the embodiment shown in FIG. 1, instant messaging may be implemented between the different terminals 11.

The image processing system may include an image processing apparatus. Specifically, the image processing apparatus may be integrated into a terminal such as a tablet computer, a mobile phone, a notebook computer, or a desktop computer equipped with a storage unit and a microprocessor and having the computing capability. In FIG. 1, the terminal is the terminal 11 in FIG. 1. Various clients required by the user may be installed in the terminal 11, such as an instant messaging client. The terminal 11 may be configured to display a conversation page of a target conversation in a client, in an example, for example, a conversation page of a target conversation in an instant messaging client. The target conversation includes at least two conversation participants. When emojis transmitted by the at least two conversation participants satisfy a trigger condition for a first emoji interaction animation, the first emoji interaction animation is displayed on the conversation page. The first emoji interaction animation includes an interaction animation between the emojis transmitted by the at least two conversation participants. A plurality of terminals 11 may be provided.

The image processing system may further include a server 20, which may be configured to receive emojis transmitted by the terminals 11, and synchronize the emojis to the terminals 11 in the same chat environment.

The schematic diagram of the scenario of the image processing system shown in FIG. 1 is merely an example. The image processing system and the scenario described in the embodiments of this application are intended to more clearly describe the technical solutions in the embodiments of this application, and do not constitute a limitation on the technical solutions provided in the embodiments of this application. A person of ordinary skill in the art may learn that, with evolution of the system and appearance of a new service scenario, the technical solutions provided in the embodiments of this application also apply to a similar technical problem.

Detailed descriptions are provided respectively in the following.

An embodiment of this application provides an image processing method. The method may be performed by a terminal or a server, or may be jointly performed by the terminal and the server. This embodiment of this application is described by using the image processing method performed by the terminal as an example.

Figure 2:
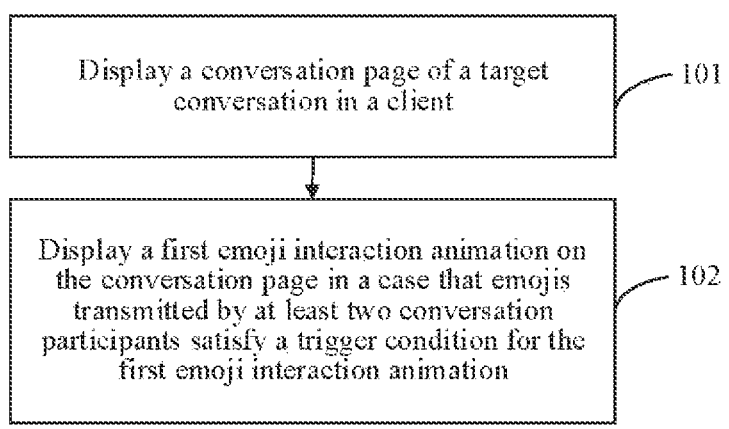
FIG. 2 is a schematic flowchart of an image processing method according to an embodiment of this application.

FIG. 2 is a schematic flowchart of an image processing method according to an embodiment of this application. The image processing method may be performed by a computer device shown in FIG. 6. The method includes the following steps.

In step 101, a conversation page of a target conversation in a client is displayed.

In examples of FIG. 2 below, the client may be an instant messaging client, for example, software that implements online chatting and communication through an instant messaging technology. However, the client is not limited to the instant messaging client. The target conversation may be understood as a chat room, a single-person conversation, or a multi-person conversation group. The single-person conversation is a conversation between a single conversation participant and a single conversation participant in an instant messaging client. The multi-person conversation group is a conversation group in which a plurality of conversation participants simultaneously participates in a conversation, which may be specifically established in real time according to user requirements. The target conversation includes at least two conversation participants. Each conversation participant may include a respective unique conversation identifier. The conversation page is a chat interface of the target conversation, which may be composed of public chat window components. The user may implement a conversation function with other conversation users through the conversation page. For example, the user can transmit the content such as a text, a voice, an image, an emoji, a video, or the like.

In the embodiments of this application, a conversation page of a target conversation in a client may be displayed. Information transmitted by a local client and information transmitted by other conversation participants in the target conversation may be displayed on the conversation page. The information may be an emoji. The emoji may be an emoji image or a user-defined emoji image, which is not specifically limited herein.

In step 102, when emojis transmitted by the at least two conversation participants satisfy a trigger condition for a first emoji interaction animation, the first emoji interaction animation is displayed on the conversation page.

In the related art, the conversation participant may transmit an emoji to increase fun of the chat and enrich user experience, but the emoji can only achieve a simple action. For example, a smiling face emoji can only be expressed through a simple smile, which has a very poor effect of expression and interaction.

In the embodiments of this application, an emoji may be added to trigger interaction effect logic. That is to say, when the emojis transmitted by the at least two conversation participants satisfy the trigger condition for the first emoji interaction animation, the interaction effect logic can be triggered. The trigger condition includes: the emojis transmitted by the at least two participants being a same emoji, and/or a correlation between the at least two transmitted emojis satisfies a preset correlation.

For example, when the emojis transmitted by the at least two conversation participants are both a heart emoji, the trigger condition can be satisfied, and the first emoji interaction animation between the heart emojis is displayed on the conversation page.

In the embodiments of this application, the first emoji interaction animation includes an interaction animation transmitted by the at least two conversation participants. That is to say, the first emoji interaction animation may be the first emoji interaction animation for interaction between the heart emojis. In an implementation, the heart emojis may be dynamically moved towards each other, so that they collide, get magnified, and then "explode" to form a first emoji interaction animation that includes many smaller-sized hearts.

In another example, when the emojis transmitted by the at least two conversation participants are both a beer mug emoji, the trigger condition can also be satisfied. The first emoji interaction animation including the beer mug emojis is displayed on the conversation page, and the first emoji interaction animation in this scenario may be a first emoji interaction animation that includes "clinking" beer mugs emojis (e.g., two beer mugs touching each other to represent a cheers/toast).

The preset correlation may be an association table between emojis having a correlation. For example, a correlation between a poo emoji and a bomb emoji or a correlation between a smiling face emoji and a knock emoji may be recorded. When the poo emoji and the bomb emoji respectively appear in the at least two transmitted emojis, it is determined that the correlation between the at least two transmitted emojis is the preset correlation. In this scenario, a first emoji interaction animation including a plurality of piles of poo may be generated from a bomb that flies onto a pile of poo and explodes.

In some implementations, a type of an emoji may be identified through a convolutional neural network (CNN). The CNN can be constructed by imitating a biological visual perception mechanism, so that the CNN can identify the type of the emoji transmitted by the conversation participant.

In an implementation, the first emoji interaction animation may be stored in a terminal or in a server. When the emojis transmitted by the at least two conversation participants satisfy the trigger condition for the first emoji interaction animation, the first emoji interaction animation stored in the terminal may be directly read and played, or the server may also be requested in real time to transmit the first emoji interaction animation for playback.

In an implementation, the first emoji interaction animation is displayed on the conversation page, which means that the first emoji interaction animation is simultaneously displayed on the conversation page of each conversation participant in the target conversation. A first emoji interaction animation playback command may be issued by the server. That is to say, the first emoji interaction animation is simultaneously played on the conversation page of the target conversation of each client in the target conversation.

A plurality of types of first emoji interaction animations are provided according to a combination of emojis. The above examples are not specific limitations. In addition, since the first emoji interaction animation may include an interaction animation between emojis, the ability of interaction and emotional expression between users can be better improved, which greatly improves the diversity of images and animations that are displayed in chat messages. In addition, the interaction animation between the emojis is presented according to system settings, and the client is not required to store the corresponding animation, so that the step of selecting the corresponding animation by a user is omitted. In this way, the terminal does not require additional storage space to store the images and/or animations, and the efficiency of interaction is improved.

In some implementations, the trigger condition may further include an interval of an emoji transmission time being within a preset time. The displaying the first emoji interaction animation on the conversation page when emojis transmitted by the at least two conversation participants satisfy a trigger condition for a first emoji interaction animation may include: displaying the first emoji interaction animation on the conversation page when the emojis transmitted by the at least two conversation participants and the emoji transmission time satisfy the trigger condition for the first emoji interaction animation.

Instant messaging is used as an example. Since the instant messaging occurs in real-time, it may be specified that the interval between the emoji transmission times cannot exceed the preset time. The preset time may be set by a system, such as 60 seconds, 90 seconds, and so on. In this way, when the emojis transmitted by the at least two participants are the same emoji, the correlation between the at least two transmitted emojis is a preset correlation, and the interval between the emoji transmission times does not exceed the preset time, the first emoji interaction animation is displayed on the conversation page.

In some implementations, before the step of displaying the first emoji interaction animation on the conversation page, the method further includes the following steps.

(1) Display the first emoji interaction animation on the conversation page when it is detected that a relationship between each pair of conversation participants in the at least two conversation participants is a friend relationship.

(2) Display friend adding prompt information on the conversation page when it is detected that a relationship between a pair of conversation participants in the at least two conversation participants is not a friend relationship.

The friend relationship is that two conversation participants add each other and become communication friends in the client. In order to increase the fun of communication, when emojis transmitted by the at least two conversation participants satisfy a trigger condition for the first emoji interaction animation, it is still detected whether a relationship between each pair of conversation participants in the at least two conversation participants is the friend relationship.

When it is detected that the relationship between each pair of conversation participants in the at least two conversation participants is the friend relationship, it indicates that the conversation participants are in the friend relationship and can perform real-time interesting interaction. However, when it is detected that the relationship between a pair of conversation participants in the at least two conversation participants is not the friend relationship, it indicates that one of the conversation participants is a stranger. In this case, the first emoji interaction animation may not be displayed on the conversation page, and the friend adding prompt information can be displayed on the conversation page, which indicates that the conversation user who has not added the second conversation participant as a friend may add him/her as a friend.

In some implementations, the displaying the first emoji interaction animation on the conversation page includes:
(1.1) acquiring a correlation value between the at least two conversation participants;
(1.2) determining a target display level of the first emoji interaction animation according to the correlation value; and
(1.3) displaying, on the conversation page, the first emoji interaction animation corresponding to the target display level.

The correlation value between the at least two conversation participants can be acquired. The correlation value may be an intimacy value. The intimacy value may be determined by a number of chats, a remarked relationship, and a number of interactions between the conversation participants. A larger correlation value indicates a closer relationship between the two participants, or vice versa.

Further, a plurality of display levels may be set for the first emoji interaction animation, for example, three display levels. It is assumed that a first display level has a higher priority than a second display level, and the second display level has a higher priority than a third display level. The first emoji interaction animation corresponding to the display level with a higher priority has a better display effect, and the first emoji interaction animation corresponding to the display level with a lower priority has a poorer display effect. Each display level may be assigned a corresponding correlation interval, where a display level with a higher priority has an interval larger than a display level with a lower priority.

In this way, a target display level of the first emoji interaction animation is determined according to the interval corresponding to the display level in which the correlation value is located. Further, the first emoji interaction animation corresponding to the target display level is displayed on the conversation page.

In some implementations, the displaying the first emoji interaction animation on the conversation page includes:
(2.1) acquiring a correlation value between the at least two conversation participants;
(2.2) determining a playback time of the first emoji interaction animation according to the correlation value; and
(2.3) displaying the first emoji interaction animation on the conversation page based on the playback time.

The correlation value between the at least two conversation participants can be acquired. The correlation value may be an intimacy value. The intimacy value may be determined by a number of chats, a remarked relationship, and a number of interactions between the conversation participants. A larger correlation value indicates a closer relationship between the two participants, or vice versa.

Further, the playback time of the first emoji interaction animation may be set to a plurality of time periods, for example, three playback times. It is assumed that a first playback time is longer than a second playback time, and the second playback time is longer than a third playback time. The first emoji interaction animation having a longer playback time has a better display effect, and the first emoji interaction animation having a shorter playback time has a poorer display effect. In this way, a correlation having a corresponding interval may be set for each playback time, and a corresponding interval having a longer playback time is larger than a corresponding interval having a shorter playback time.

The playback time of the first emoji interaction animation is determined according to the interval in which the correlation value is located. Further, the first emoji interaction animation having a corresponding interval is displayed on the conversation page based on the playback time.

In some implementations, the method further includes: displaying a second emoji interaction animation on the conversation page when a target emoji transmitted by a new conversation participant and the emojis satisfy a trigger condition for the second emoji interaction animation, the second emoji interaction animation including an interaction animation between the emojis transmitted by the at least two conversation participants and the target emoji.

The new conversation participant is not a conversation participant in the at least two conversation participants in the target conversation. That is to say, the new conversation participant may be a newly added conversation participant in the target conversation and a conversation participant that has not transmitted a message so far. The trigger condition for the second emoji interaction animation may be interaction effect logic of the multi-person interaction, which includes at least one of emojis transmitted by at least three participants being the same emoji or a correlation among the at least three transmitted emojis being a target correlation.

For example, when the emojis transmitted by the at least three conversation participants are all the beer mug emoji, the trigger condition can be satisfied, and the first emoji interaction animation including three beer mug emojis is displayed on the conversation page.

In the embodiments of this application, the second emoji interaction animation includes the interaction animation transmitted by the at least three conversation participants. The first emoji interaction animation including the at least three beer mug emojis may be displayed on the conversation page, and the second emoji interaction animation in this scenario may be the second emoji interaction animation including the at least three clinking beer mugs emojis.

In some implementations, the displaying a second emoji interaction animation on the conversation page when a target emoji transmitted by a new conversation participant and the emojis satisfy a trigger condition for the second emoji interaction animation includes: displaying the second emoji interaction animation on the conversation page when the target emoji transmitted by the new conversation participant and the emojis and a target emoji transmission time and an emoji transmission time satisfy the trigger condition for the second emoji interaction animation.

Instant messaging is used as an example. Since the instant messaging is real-time, it may be specified that the interval between the target emoji and the emoji transmission times cannot exceed the preset time. The preset time may be set by a system, such as 60 seconds, 90 seconds, and so on. Since at least two emojis are provided, in the embodiments of this application, a time interval between the target emoji and a time at which the emoji is finally transmitted in the at least two emojis is calculated.

In this way, the second emoji interaction animation is displayed on the conversation page when the target emoji transmitted by the new conversation participant and the emojis and a target emoji transmission time and an emoji transmission time all satisfy the trigger condition for the second emoji interaction animation.

In an implementation, the displaying the second emoji interaction animation on the conversation page includes:

(3.1) displaying the second emoji interaction animation on the conversation page when it is detected that playback of the first emoji interaction animation is completed; and (3.2) superimposing the second emoji interaction animation on the conversation page when it is detected that the playback of the first emoji interaction animation is not completed.

Since a previous first emoji interaction animation may not have been played yet during playing of the second emoji interaction animation, it may be detected whether the playback of first emoji interaction animation is completed before the second emoji interaction animation is displayed on the conversation page.

When it is detected that the playback of the first emoji interaction animation is completed, the second emoji interaction animation is directly displayed on the conversation page. When it is detected that the playback of the first emoji interaction animation is not completed, the second emoji interaction animation may be directly superimposed on the conversation page without waiting for the playback of the first emoji interaction animation, so as to realize the superimposition effect of simultaneous playback and enrich the effect of emoji interaction.

It may be learned from the above that in the embodiments of this application, a conversation page of a target conversation in a client is displayed. The target conversation includes at least two conversation participants. A first emoji interaction animation is displayed on the conversation page when emojis transmitted by the at least two conversation participants satisfy a trigger condition for the first emoji interaction animation. The first emoji interaction animation includes an interaction animation between the emojis transmitted by the at least two conversation participants. In this way, when the emojis transmitted by the at least two conversation participants satisfy the trigger condition for the first emoji interaction animation, the first emoji interaction animation for interaction between the emojis transmitted by the at least two conversation participants can be played in real time, which increases fun and diversity of communication interaction and greatly improves the diversity of images and animations that are displayed in chat messages.

With reference to the method described in the foregoing embodiments, the following further provides detailed description by using examples.

In this embodiment, the image processing apparatus is specifically integrated in the server by way of example for description. For details, reference is made to the following description.

Figure 3:
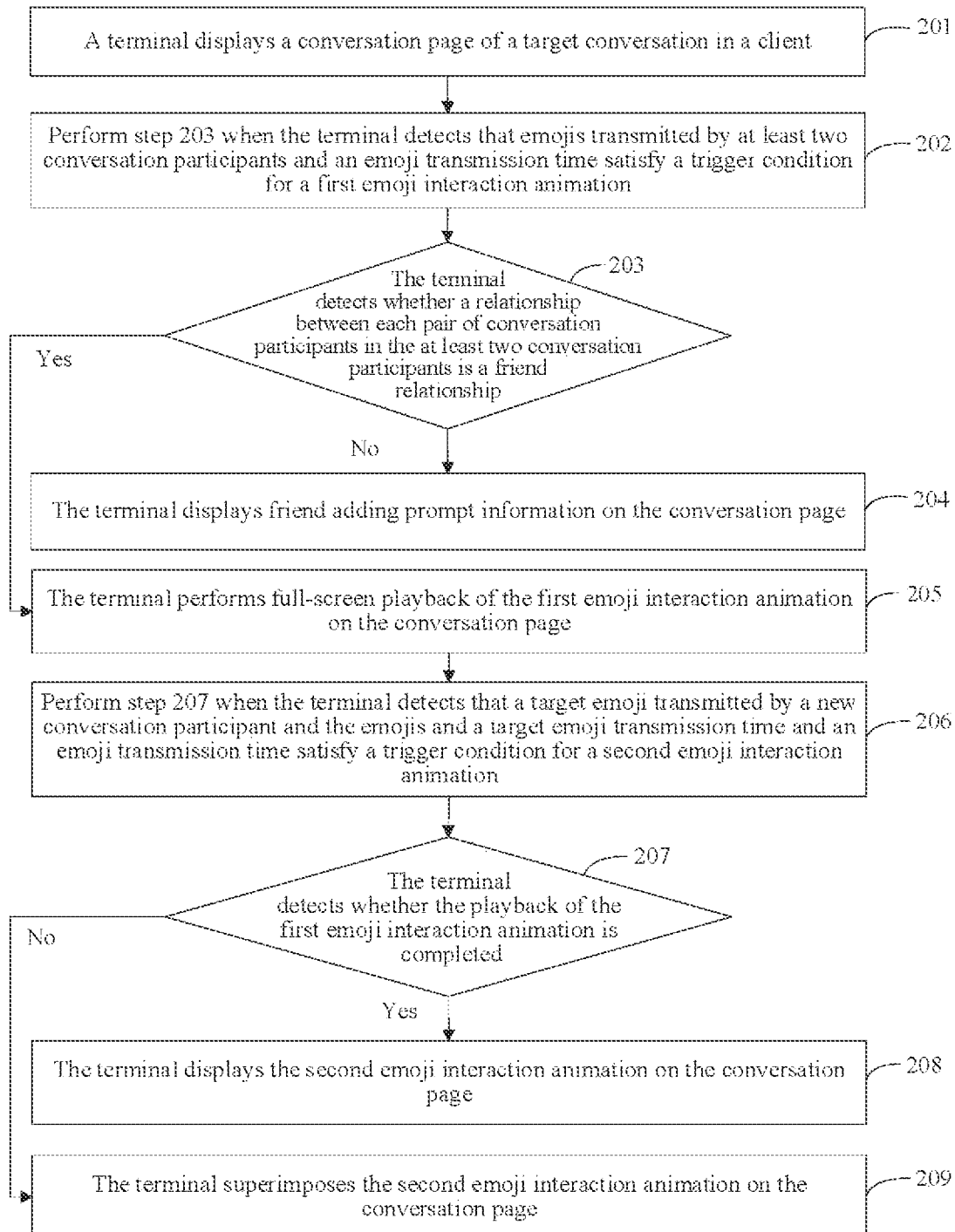
FIG. 3 is another schematic flowchart of an image processing method according to an embodiment of this application.

FIG. 3 is another schematic flowchart of an image processing method according to an embodiment of this application. The method process may include the following steps.

In step 201, a terminal displays a conversation page of a target conversation in a client.

Figure 4A:
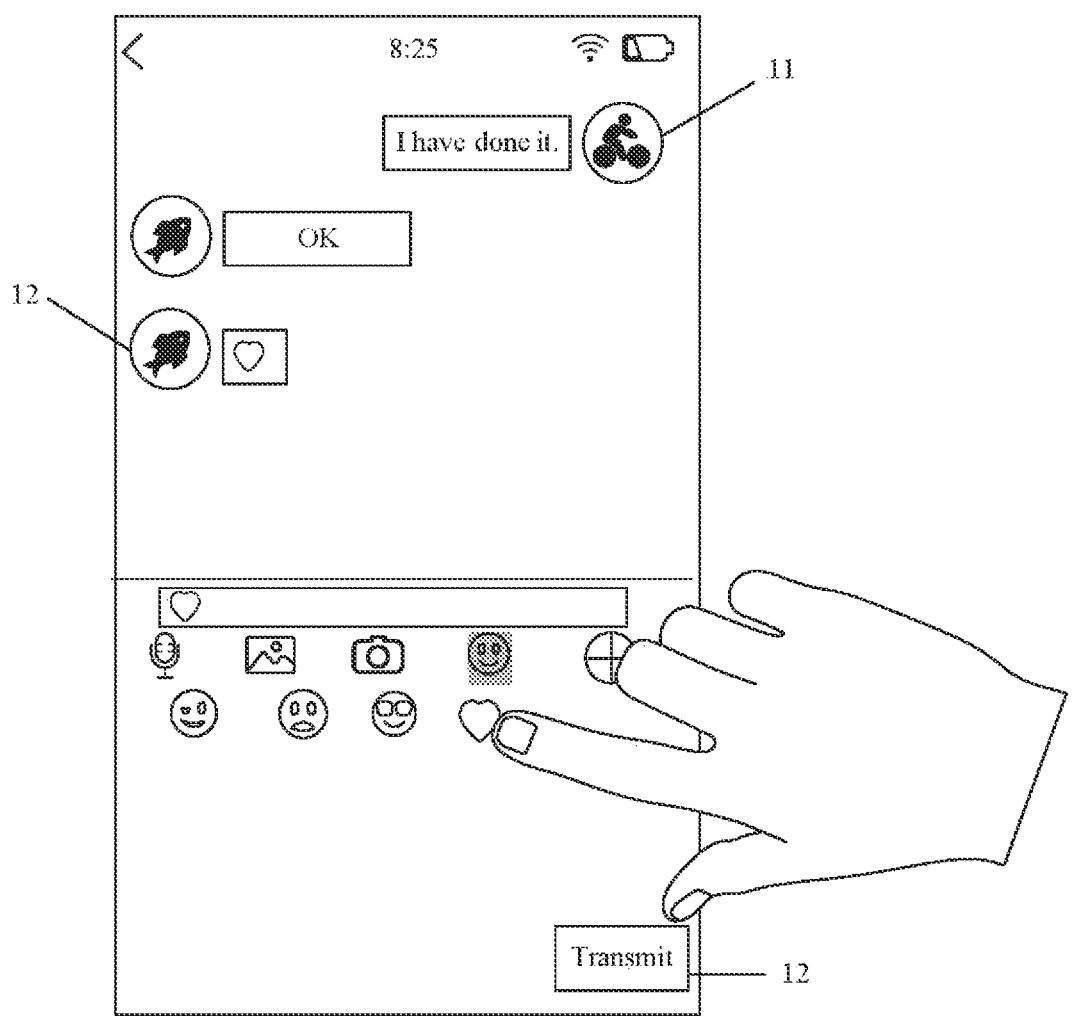
FIG. 4a is a schematic diagram of a scenario of an image processing method according to an embodiment of this application.

Referring to FIG. 4a together, in the examples shown in FIG. 3 and below, the client may be an instant messaging client, which is not limited thereto. The terminal 11 is configured to display a conversation page of a target conversation in a client. On the conversation page, the conversation participant may implement a conversation function with other conversation users through the conversation page, for example, transmit contents such as a text, a voice, an image, an emoji, a video, or the like.

For example, FIG. 4a includes a first conversation user 11 and a second conversation user 12. The first conversation user may be a conversation user in a client on the terminal, and an emoji input panel may be displayed on the conversation page. The emoji input panel includes a plurality of emojis, such as a heart emoji, and the user may touch the heart emoji and display the heart emoji in a message edit box in response to a touch operation of selecting the heart emoji from the plurality of emojis.

In the embodiments of this application, the emoji "in response to" is used for indicating a condition or a status on which one or more to-be-performed operations depend. When the condition or the status is satisfied, the one or more operations may be performed in real time or have a set delay. Unless explicitly stated, there is no limitation on the order in which the plurality of operations are performed.

In step 202, when the terminal detects that emojis transmitted by at least two conversation participants and an emoji transmission time satisfy a trigger condition for a first emoji interaction animation, step 203 is performed.

Figure 4B:
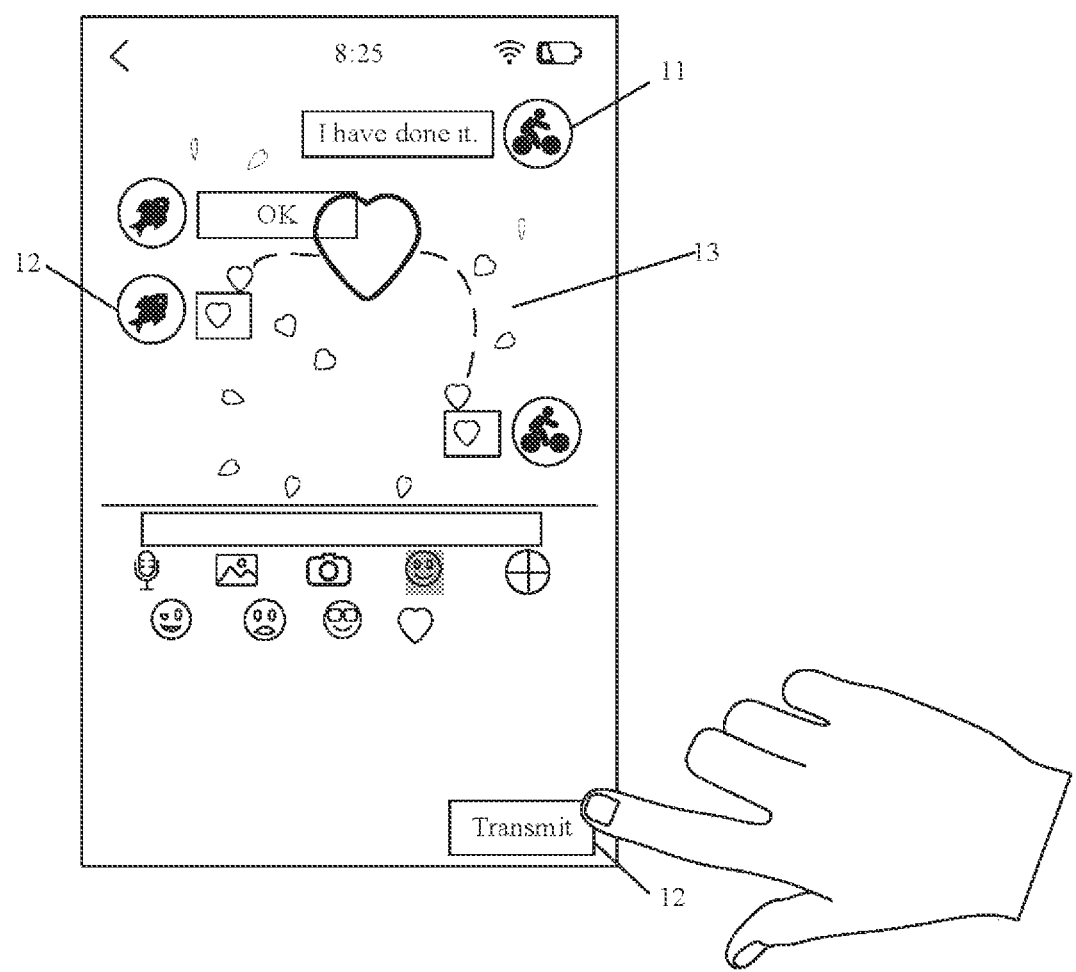
FIG. 4b is a schematic diagram of another scenario of an image processing method according to an embodiment of this application.

Referring to FIG. 4b together, the first conversation user 11 may touch a transmission control 12, and the terminal 10 displays, on the conversation page in response to the touch operation of the transmission control 12, the heart emoji displayed in the message edit box. In this case, when the terminal 10 detects that the emojis transmitted by the two conversation participants are both the heart emoji and the interval between the transmission times of the two emojis is within 10 seconds, and it is determined that the terminal detects that the emojis transmitted by the at least two conversation participants and the emoji transmission times satisfy the trigger condition for the first emoji interaction animation, step 203 is performed.

Figure 4C:
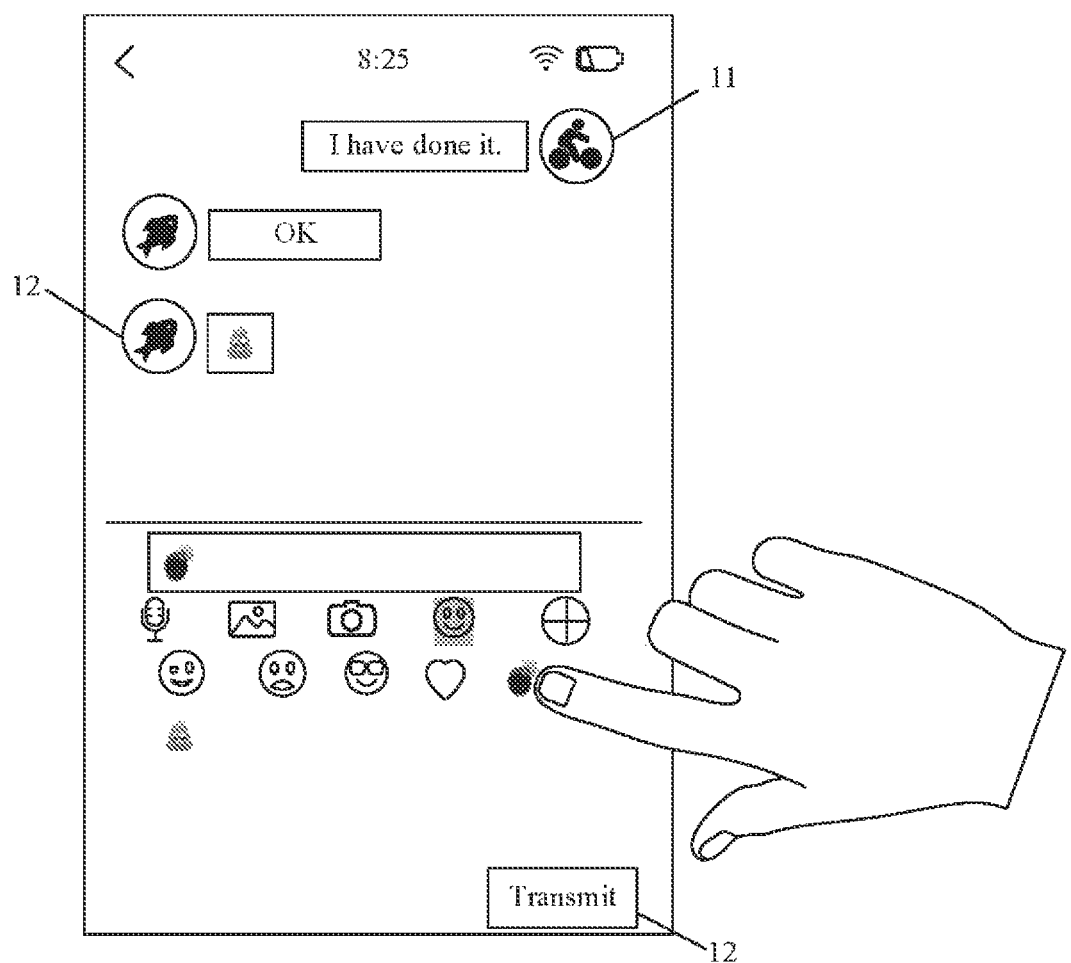
FIG. 4c is a schematic diagram of another scenario of an image processing method according to an embodiment of this application.
Figure 4D:
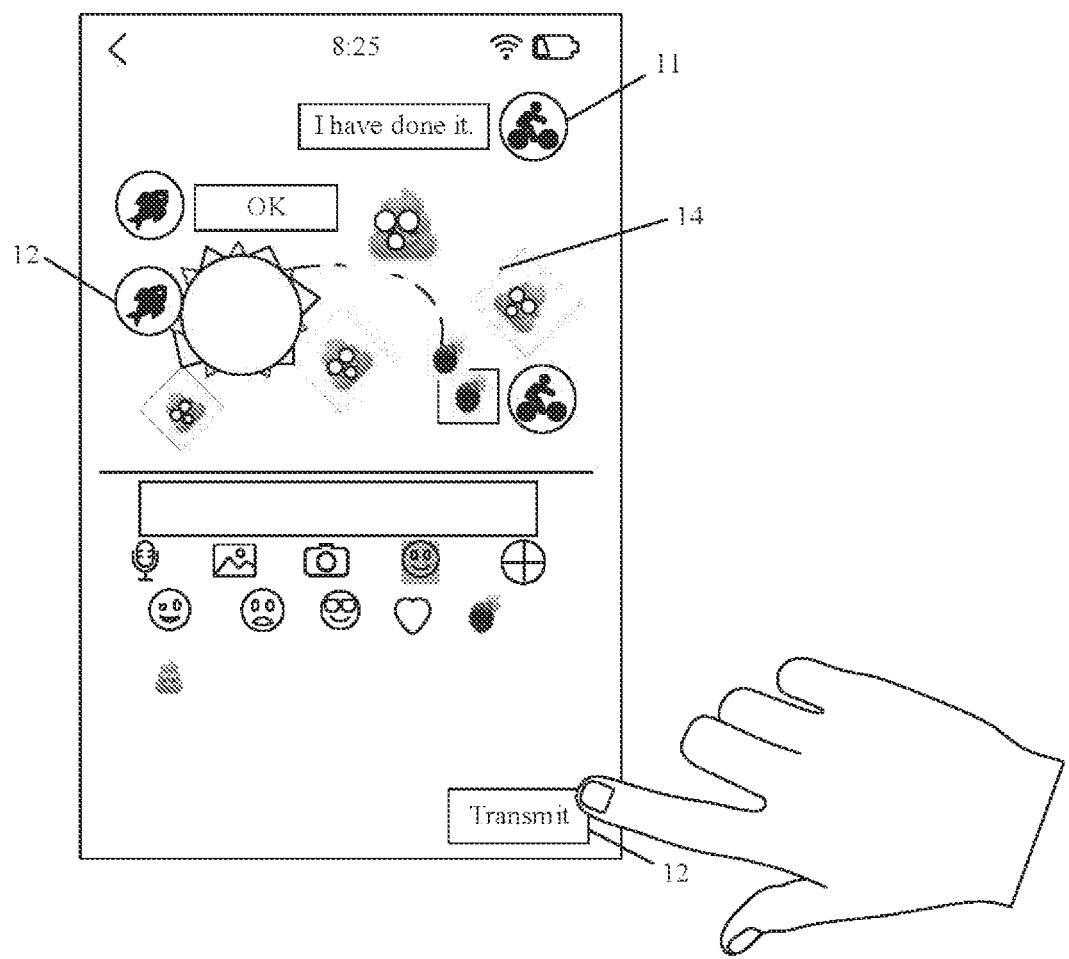
FIG. 4d is a schematic diagram of another scenario of an image processing method according to an embodiment of this application.

In another example, referring to FIG. 4c and FIG. 4d together, an emoji input panel may be displayed on the conversation page. The emoji input panel includes a plurality of emojis, such as a bomb emoji. The user may touch a poo emoji and display the bomb emoji in a message edit box in response to a touch operation of selecting the bomb emoji from the plurality of emojis. The first conversation user 11 may touch a transmission control 12, and the terminal 10 displays, on the conversation page in response to the touch operation of the transmission control 12, the bomb emoji displayed in the message edit box. In this case, when the terminal 10 detects that the emojis transmitted by the two conversation participants are respectively a poo emoji and the bomb emoji and the interval between the transmission times of the two emojis is within eight seconds, and it is determined that the terminal detects that the emojis transmitted by the at least two conversation participants and the emoji transmission times satisfy the trigger condition for the first emoji interaction animation, step 203 is performed.

In step 203, the terminal detects whether a relationship between each pair of conversation participants in the at least two conversation participants is a friend relationship.

The friend relationship is that two conversation participants add each other and become communication friends in the client. In order to increase the fun of communication, when emojis transmitted by the at least two conversation participants satisfy a trigger condition for the first emoji interaction animation, the terminal continues to detect whether the relationship between each pair of conversation participants in the at least two conversation participants is the friend relationship.

When the terminal detects that a relationship between each pair of conversation participants in the at least two conversation participants is not the friend relationship, step 204 is performed. When it is detected that a relationship between each pair of conversation participants in the at least two conversation participants is the friend relationship, step 205 is performed.

In step 204, the terminal displays friend adding prompt information on the conversation page.

However, when it is detected that the relationship between a pair of conversation participants in the at least two conversation participants is not the friend relationship, it indicates that one of the conversation participants is a stranger. In this case, the first emoji interaction animation may not be displayed on the conversation page, and the friend adding prompt information may be displayed on the conversation page. For example, information such as "the second conversation participant is not your friend, please add" is displayed, which indicates that the conversation user who has not added the second conversation participant as a friend may add him/her as a friend.

In step 205, the terminal performs full-screen playback of the first emoji interaction animation on the conversation page.

When it is detected that the relationship between each pair of conversation participants in the at least two conversation participants is the friend relationship, it indicates that the conversation participants are in the friend relationship and can perform real-time interesting interaction. The terminal may directly perform the full-screen playback of the first emoji interaction animation on the conversation page. That is to say, the first emoji interaction animation may be displayed in a full-screen area such as a chat interface, an information input box, and a message bubble.

The first emoji interaction animation includes an interaction animation between emojis transmitted by the at least two conversation participants, and there are a plurality of types of first emoji interaction animations. For example, still referring to FIG. 4*b*, when the emojis of the first conversation participant 11 and the second conversation participant 12 are both the heart emoji, the heart emojis may be dynamically moved towards each other, so that they collide, get magnified, and then explode to form a first emoji interaction animation 13 including a plurality of small hearts for playback. For example, still referring to FIG. 4*d*, when the second conversation participant 12 transmits a poo emoji and the first conversation participant 11 transmits a bomb emoji, a second emoji interaction animation 14 including a plurality of piles of poo may be generated from a bomb that flies onto a pile of poo and explodes and played.

According to the relationship between the emojis, the first emoji interaction animation may further be the first emoji interaction animation for interaction animation between other emojis, which is not specifically limited by the example herein.

In step 206, when the terminal detects that the target emoji transmitted by the new conversation participant and the emojis and a target emoji transmission time and an emoji transmission time satisfy the trigger condition for the second emoji interaction animation, step 207 is performed.

The new conversation participant is not a conversation participant in the at least two conversation participants in the target conversation. That is to say, the new conversation participant may be a newly added conversation participant in the target conversation and a conversation participant that has not transmitted a message so far, that is, a participant in the target conversation other than the first conversation participant 11 and the second conversation participant 12. The trigger condition for the second emoji interaction animation may be interaction effect logic of the multi-person interaction, which includes at least one of emojis transmitted by at least three participants being the same emoji or a correlation among the at least three transmitted emojis being a target correlation.

For example, when the emojis transmitted by the first conversation participant 11 and the second conversation participant 12 are both a beer mug emoji, the target emoji transmitted by the new conversation participant is also the beer mug emoji, an interval between a time at which the beer mug emoji is finally transmitted by one of the first conversation participant 11 and the second conversation participant 12 and a time at which the new conversation participant transmits the target emoji is 11 seconds less than the preset time of 90 seconds, and it is determined that the terminal detects that the target emoji transmitted by the new conversation participant and the emojis and a target emoji transmission time and an emoji transmission time satisfy the trigger condition for the second emoji interaction animation, step 207 is performed.

In step 207, the terminal detects whether playback of the first emoji interaction animation is completed.

Since a previous first emoji interaction animation may not have been played yet during playing of the second emoji interaction animation, it may be detected whether the playback of first emoji interaction animation is completed before the second emoji interaction animation is displayed on the conversation page.

When the terminal detects that the playback of the first emoji interaction animation is completed, step 208 is performed. When it is detected that the playback of the first emoji interaction animation is not completed, step 209 is performed.

In step 208, the terminal displays a second emoji interaction animation on the conversation page.

The second emoji interaction animation is directly displayed on the conversation page when it is detected that the playback of the first emoji interaction animation is completed. For example, the second emoji interaction animation may be the second emoji interaction animation including the three clinking beer mugs emojis.

In step 209, the terminal superimposes the second emoji interaction animation on the conversation page.

When it is detected that the playback of the first emoji interaction animation is not completed, the second emoji interaction animation may be directly superimposed on the conversation page without waiting for the completion of playback of the first emoji interaction animation, so as to realize the superimposition effect of simultaneous playback and enrich the effect of emoji interaction.

For example, when the first emoji interaction animation is a first emoji interaction animation including two clinking beer mugs emojis, the second emoji interaction animation is a second emoji interaction animation including three clinking beer mugs emojis. The second emoji interaction animation including the three clinking beer mugs emojis may be superimposed on the first emoji interaction animation including two clinking beer mugs emojis, so as to create the interactive atmosphere and further enhance the diversity of images and animations that are displayed in chat messages.

It may be learned from the above that in the embodiments of this application, a conversation page of a target conversation in a client is displayed. The target conversation includes at least two conversation participants. A first emoji interaction animation is displayed on the conversation page when emojis transmitted by the at least two conversation participants satisfy a trigger condition for the first emoji interaction animation. The first emoji interaction animation includes an interaction animation between the emojis transmitted by the at least two conversation participants. In this way, when the emojis transmitted by the at least two conversation participants satisfy the trigger condition for the first emoji interaction animation, the first emoji interaction animation for interaction between the emojis transmitted by the at least two conversation participants can be played in real time, which increases fun and diversity of communication interaction and greatly improves the diversity of images and animations that are displayed in chat messages.

Further, in the embodiments of this application, during playing of the first emoji interaction animation, the relationship between the target emoji and the emoji of the new conversation participant may further be detected, to trigger the playback of the second interaction animation, thereby enhancing the interactive effect more effectively and further enhancing the diversity of information processing.

To help better implement the image processing method provided in the embodiments of this application, an apparatus based on the foregoing image processing method is further provided in the embodiments of this application. Terms have meanings the same as those in the foregoing image processing method. For specific implementation details, reference may be made to the description in the method embodiments.

Figure 5:
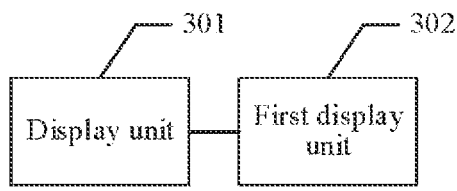
FIG. 5 is a schematic structural diagram of an image processing apparatus according to an embodiment of this application.

FIG. 5 is a schematic structural diagram of an image processing apparatus according to an embodiment of this application. The image processing apparatus may include a display unit 301, a first display unit 302, and the like.

The display unit 301 is configured to display a conversation page of a target conversation in a client. The target conversation includes at least two conversation participants.

The first display unit 302 is configured to display a first emoji interaction animation on the conversation page when emojis transmitted by the at least two conversation participants satisfy a trigger condition for the first emoji interaction animation. The first emoji interaction animation includes an interaction animation between the emojis transmitted by the at least two conversation participants.

In some embodiments, the first display unit 302 is configured to:
  display the first emoji interaction animation on the conversation page when the emojis transmitted by the at least two conversation participants and the emoji transmission times satisfy the trigger condition for the first emoji interaction animation.

In some embodiments, the first display unit 302 is configured to:
  perform full-screen playback of the first emoji interaction animation on the conversation page when the emojis transmitted by the at least two conversation participants satisfy the trigger condition for the first emoji interaction animation.

In some embodiments, the first display unit 302 is configured to:
  acquire a correlation value between the at least two conversation participants when the emojis transmitted by the at least two conversation participants satisfy the trigger condition for the first emoji interaction animation;
  determine a target display level of the first emoji interaction animation according to the correlation value; and
  display, on the conversation page, the first emoji interaction animation corresponding to the target display level.

In some embodiments, the first display unit 302 is configured to:
  acquire a correlation value between the at least two conversation participants when the emojis transmitted by the at least two conversation participants satisfy the trigger condition for the first emoji interaction animation;
  determine a playback time of the first emoji interaction animation according to the correlation value; and
  display the first emoji interaction animation on the conversation page based on the playback time.

In some embodiments, the image processing apparatus further includes:
  a second display unit, configured to display the second emoji interaction animation on the conversation page when a target emoji transmitted by a new conversation participant and the emojis satisfy a trigger condition for the second emoji interaction animation. The second emoji interaction animation includes an interaction animation between the emojis transmitted by the at least two conversation participants and the target emoji. The new conversation participant is a conversation participant in the target conversation other than the at least two conversation participants.

In some embodiments, the second display unit is configured to:
  display the second emoji interaction animation on the conversation page when the target emoji transmitted by the new conversation participant and the emojis and a target emoji transmission time and an emoji transmission time satisfy the trigger condition for the second emoji interaction animation.

In some embodiments, the second display unit is further configured to:
  display the second emoji interaction animation on the conversation page when a target emoji transmitted by the new conversation participant and the emojis satisfy the trigger condition for the second emoji interaction animation, and
  that it is detected that playback of the first emoji interaction animation is completed; and
  superimpose the second emoji interaction animation on the conversation page when it is detected that the playback of the first emoji interaction animation is not completed.

In some embodiments, the apparatus further includes:
  the first display unit 302 is further configured to display the first emoji interaction animation on the conversation page when emojis transmitted by the at least two conversation participants satisfy the trigger condition for the first emoji interaction animation and that it is detected that a relationship between each pair of conversation participants in the at least two conversation participants is a friend relationship; and a prompting unit, configured to display friend adding prompt information on the conversation page when the emojis transmitted by the at least two conversation participants satisfy the trigger condition for the first emoji interaction animation and that it is detected that a relationship between a pair of conversation participants in the at least two conversation participants is not a friend relationship.

For specific implementation of the foregoing units, reference may be made to the foregoing embodiments, which are not described repeatedly herein.

It may be learned from the above that in the embodiments of this application, the conversation page of the target conversation in a client is displayed by the display unit 301. The target conversation includes at least two conversation participants. The first display unit 302 is configured to display a first emoji interaction animation on the conversation page when emojis transmitted by the at least two conversation participants satisfy a trigger condition for the first emoji interaction animation. The first emoji interaction animation includes an interaction animation between the emojis transmitted by the at least two conversation participants. In this way, when the emojis transmitted by the at least two conversation participants satisfy the trigger condition for the first emoji interaction animation, the first emoji interaction animation for interaction between the emojis transmitted by the at least two conversation participants can be played in real time, which increases fun and diversity of communication interaction and greatly improves the diversity of images and animations that are displayed in chat messages.

Figure 6:
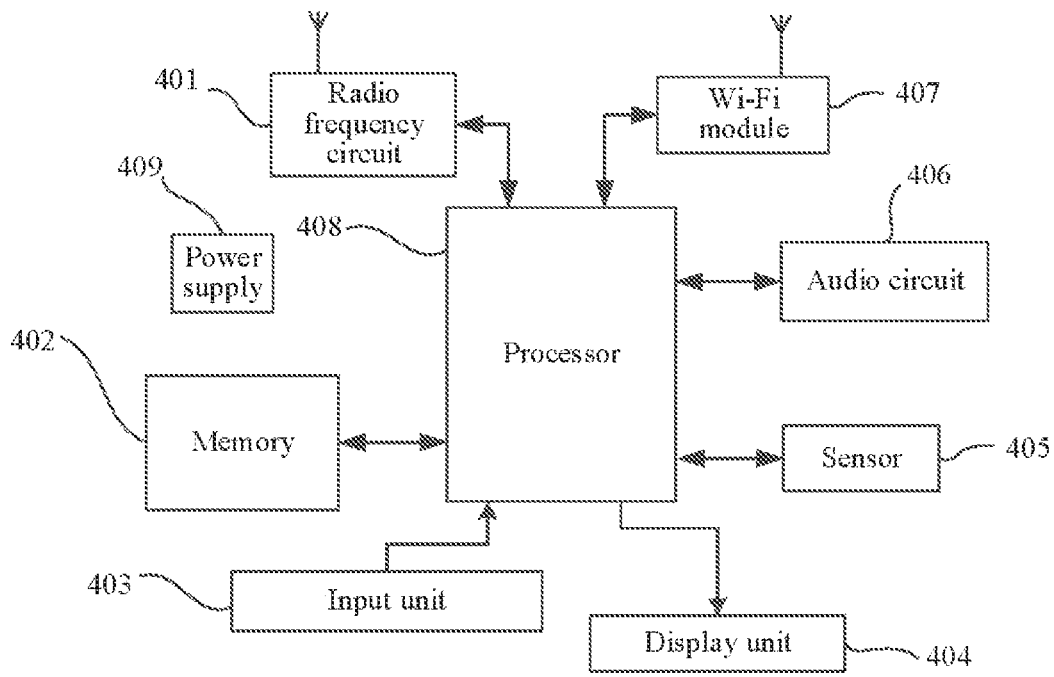
FIG. 6 is a schematic structural diagram of a terminal according to an embodiment of this application.

An embodiment of this application further provides a computer device, and the computer device may be a server or a terminal. FIG. 6 is a schematic structural diagram of a terminal according to an embodiment of this application. Specifically:

the computer device may include components such as a radio frequency (Radio Frequency, RF) circuit 401, a memory 402 including one or more computer-readable storage media, an input unit 403, a display unit 404, a sensor 405, an audio circuit 406, a wireless fidelity (WiFi) module 407, a processor 408 including one or more processing cores, and a power supply 409. A person skilled in the art may understand that the terminal structure shown in FIG. 6 does not constitute a limitation on the terminal, and may include more or fewer components than shown, or combine some components, or have different component arrangements. where Although not shown in the figure, the terminal may further include a camera, a Bluetooth module, and the like, which are not further described herein. In this embodiment, the processor 408 in the terminal may load executable files corresponding to processes of one or more applications to the memory 402 according to the following instructions, and the processor 408 runs an application stored in the memory 402, to implement various functions:

A conversation page of a target conversation in a client is displayed. The target conversation includes at least two conversation participants. When emojis transmitted by the at least two conversation participants satisfy a trigger condition for a first emoji interaction animation, the first emoji interaction animation is displayed on the conversation page. The first emoji interaction animation includes an interaction animation between the emojis transmitted by the at least two conversation participants.

In the foregoing embodiments, the descriptions of the embodiments have respective focuses. For a part that is not described in detail in an embodiment, refer to the foregoing detailed description of the image processing method. Details are not described herein again.

It may be learned from the above that the computer device in the embodiments of this application can display the conversation page of the target conversation in the client. The target conversation includes at least two conversation participants. A first emoji interaction animation is displayed on the conversation page when emojis transmitted by the at least two conversation participants satisfy a trigger condition for the first emoji interaction animation. The first emoji interaction animation includes an interaction animation between the emojis transmitted by the at least two conversation participants. In this way, when the emojis transmitted by the at least two conversation participants satisfy the trigger condition for the first emoji interaction animation, the first emoji interaction animation for interaction between the emojis transmitted by the at least two conversation participants can be played in real time, which increases fun and diversity of communication interaction and greatly improves the diversity of images and animations that are displayed in chat messages.

A person of ordinary skill in the art may understand that, all or some steps of various methods in the embodiments may be implemented through instructions, or implemented through instructions controlling relevant hardware, and the instructions may be stored in a computer-readable storage medium and loaded and executed by a processor.

Accordingly, the embodiments of this application provide a computer-readable storage medium, storing a plurality of instructions, the instructions being loaded by a processor, to perform the steps in any one of the image processing method according to the embodiments of this application. For example, the instructions may perform the following steps:

A conversation page of a target conversation in a client is displayed. The target conversation includes at least two conversation participants. When emojis transmitted by the at least two conversation participants satisfy a trigger condition for a first emoji interaction animation, the first emoji interaction animation is displayed on the conversation page. The first emoji interaction animation includes an interaction animation between the emojis transmitted by the at least two conversation participants.

According to an aspect of this application, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, so that the computer device performs the method provided in the various implementations in the foregoing embodiments.

For specific implementation of the foregoing operations, reference may be made to the foregoing embodiments. Details are not described herein again.

where the computer-readable storage medium may include: a read-only memory (ROM), a random access memory (RAM), a magnetic disk, an optical disc, and the like.

Because the instructions stored in the computer-readable storage medium may perform the steps of any image processing method provided in the embodiments of this application, the computer program can implement beneficial effects that may be implemented by any image processing method in the embodiments of this application. For details, refer to the foregoing embodiments. Details are not described herein again.

The image processing method and apparatus, the computer-readable storage medium provided in the embodiments of this application are described in detail above. The principles and implementations of this application are described through specific examples in this specification and the descriptions of the embodiments are only intended to help understand the methods and core ideas of this application. Meanwhile, a person of ordinary skill in the art may make modifications to the specific implementations and application scopes according to the ideas of this application. In conclusion, the content of the specification should not be construed as a limitation to this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs display and/or detection. In practical application, the foregoing functions may be allocated to and completed by different functional modules according to requirements, that is, an inner structure of a device is divided into different functional modules to implement all or a part of the functions described above.

What is claimed is:

1. An image processing method, performed by a computer device, the method comprising:
    displaying a conversation page of a target conversation corresponding to an instant messaging application, the target conversation including at least two conversation participants; and
    in accordance with a determination that emojis transmitted by the at least two conversation participants in the target conversation satisfy a trigger condition for a first emoji interaction animation:
    acquiring a correlation value between the at least two conversation participants; and
    displaying the first emoji interaction animation on the conversation page in a visual manner consistent with the correlation value, wherein the first emoji interaction animation comprises an interaction animation between the emojis transmitted by the at least two conversation participants and different correlation values result in displaying the first emoji interaction animation on the conversation page in visually different manners.

2. The image processing method according to claim 1, further comprising:
    in accordance with a determination that the target conversation includes a new conversation participant that is distinct from the at least two conversation participants, and in response to a determination that a target emoji transmitted by the new conversation participant and the emojis satisfy a trigger condition for a second emoji interaction animation:
    displaying the second emoji interaction animation on the conversation page, wherein the second emoji interaction animation comprises an interaction animation between the emojis transmitted by the at least two conversation participants and the target emoji.

3. The image processing method according to claim 2, wherein displaying the second emoji interaction animation on the conversation page comprises:
    displaying the second emoji interaction animation on the conversation page when the target emoji transmitted by the new conversation participant and the emojis and a target emoji transmission time and an emoji transmission time satisfy the trigger condition for the second emoji interaction animation.

4. The image processing method according to claim 2, wherein the displaying the second emoji interaction animation on the conversation page comprises one of:
    in accordance with a determination that playback of the first emoji interaction animation is completed, displaying the second emoji interaction animation on the conversation page; and
    in accordance with a determination that the playback of the first emoji interaction animation is not completed, superimposing the second emoji interaction animation on the conversation page.

5. The image processing method according to claim 1, wherein displaying the first emoji interaction animation on the conversation page comprises:
    displaying the first emoji interaction animation on the conversation page when the emojis transmitted by the at least two conversation participants and an emoji transmission time satisfy the trigger condition for the first emoji interaction animation.

6. The image processing method according to claim 1, further comprising before displaying the first emoji interaction animation on the conversation page:
    displaying the first emoji interaction animation on the conversation page when it is detected that a relationship between each pair of conversation participants in the at least two conversation participants is a friend relationship; and
    displaying friend adding prompt information on the conversation page when it is detected that a relationship between a pair of conversation participants in the at least two conversation participants is not a friend relationship.

7. The image processing method according to claim 1, wherein displaying the first emoji interaction animation on the conversation page comprises:
    performing full-screen playback of the first emoji interaction animation on the conversation page.

8. The image processing method according to claim 1, wherein displaying the first emoji interaction animation on the conversation page in a visual manner consistent with the correlation value comprises:
   determining a target display level of the first emoji interaction animation according to the correlation value; and
   displaying, on the conversation page, the first emoji interaction animation according to a correlation interval corresponding to the target display level.

9. The image processing method according to claim 1, wherein displaying the first emoji interaction animation on the conversation page in a visual manner consistent with the correlation value comprises:
   determining a playback time of the first emoji interaction animation according to the correlation value; and
   displaying the first emoji interaction animation on the conversation page based on the playback time.

10. The image processing method according to claim 1, wherein the trigger condition comprises one of:
    the emojis transmitted by the at least two conversation participants are the same emoji;
    a correlation between the at least two transmitted emojis satisfy a preset correlation; or
    an interval between emoji transmission times of the at least two emojis being within a preset time.

11. A computer device, comprising:
    one or more processors; and
    memory storing one or more programs, the one or more programs comprising instructions that, when executed by the one or more processors, cause the one or more processors to perform operations including:
    in accordance with a determination that emojis transmitted by the at least two conversation participants in the target conversation satisfy a trigger condition for a first emoji interaction animation:
    acquiring a correlation value between the at least two conversation participants; and
    displaying the first emoji interaction animation on the conversation page in a visual manner consistent with the correlation value, wherein the first emoji interaction animation comprises an interaction animation between the emojis transmitted by the at least two conversation participants and different correlation values result in displaying the first emoji interaction animation on the conversation page in visually different manners.

12. The computer device according to claim 11, the operations further comprising:
    in accordance with a determination that the target conversation includes a new conversation participant that is distinct from the at least two conversation participants, and in response to a determination that a target emoji transmitted by the new conversation participant and the emojis satisfy a trigger condition for a second emoji interaction animation:
    displaying the second emoji interaction animation on the conversation page, wherein the second emoji interaction animation comprises an interaction animation between the emojis transmitted by the at least two conversation participants and the target emoji.

13. The computer device according to claim 12, wherein displaying the second emoji interaction animation on the conversation page comprises:
    displaying the second emoji interaction animation on the conversation page when the target emoji transmitted by the new conversation participant and the emojis and a target emoji transmission time and an emoji transmission time satisfy the trigger condition for the second emoji interaction animation.

14. The computer device according to claim 12, wherein the displaying the second emoji interaction animation on the conversation page comprises one of:
    in accordance with a determination that playback of the first emoji interaction animation is completed, displaying the second emoji interaction animation on the conversation page; and
    in accordance with a determination that the playback of the first emoji interaction animation is not completed, superimposing the second emoji interaction animation on the conversation page.

15. The computer device according to claim 12, wherein displaying the first emoji interaction animation on the conversation page comprises:
    displaying the first emoji interaction animation on the conversation page when the emojis transmitted by the at least two conversation participants and an emoji transmission time satisfy the trigger condition for the first emoji interaction animation.

16. A non-transitory computer-readable storage medium, storing one or more instructions, the one or more instructions, when executed by one or more processors of a computer device, cause the computer device to perform operations comprising:
    displaying a conversation page of a target conversation corresponding to an instant messaging application, the target conversation including at least two conversation participants; and
    in accordance with a determination that emojis transmitted by the at least two conversation participants in the target conversation satisfy a trigger condition for a first emoji interaction animation:
    acquiring a correlation value between the at least two conversation participants; and
    displaying the first emoji interaction animation on the conversation page in a visual manner consistent with the correlation value, wherein the first emoji interaction animation comprises an interaction animation between the emojis transmitted by the at least two conversation participants and different correlation values result in displaying the first emoji interaction animation on the conversation page in visually different manners.

17. The non-transitory computer-readable storage medium according to claim 16, further comprising before displaying the first emoji interaction animation on the conversation page:
    displaying the first emoji interaction animation on the conversation page when it is detected that a relationship between each pair of conversation participants in the at least two conversation participants is a friend relationship; and
    displaying friend adding prompt information on the conversation page when it is detected that a relationship between a pair of conversation participants in the at least two conversation participants is not a friend relationship.

18. The non-transitory computer-readable storage medium according to claim 16, wherein displaying the first emoji interaction animation on the conversation page comprises:
    performing full-screen playback of the first emoji interaction animation on the conversation page.

19. The non-transitory computer-readable storage medium according to claim 16, wherein displaying the first emoji interaction animation on the conversation page in a visual manner consistent with the correlation value comprises:
- determining a target display level of the first emoji interaction animation according to the correlation value; and
- displaying, on the conversation page, the first emoji interaction animation according to a correlation interval corresponding to the target display level.

20. The non-transitory computer-readable storage medium according to claim 16, wherein displaying the first emoji interaction animation on the conversation page in a visual manner consistent with the correlation value comprises:
- determining a playback time of the first emoji interaction animation according to the correlation value; and
- displaying the first emoji interaction animation on the conversation page based on the playback time.

* * * * *